US008775955B2

(12) United States Patent
Zendler et al.

(10) Patent No.: US 8,775,955 B2
(45) Date of Patent: Jul. 8, 2014

(54) ATTRACTION-BASED DATA VISUALIZATION

(75) Inventors: Holger Zendler, Heidelberg (DE);
Benjamin Spieler, Mannheim (DE);
Nadine Gaertner, Speyer (DE)

(73) Assignee: SAP AG, Walldorf (DE)

( * ) Notice: Subject to any disclaimer, the term of this patent is extended or adjusted under 35 U.S.C. 154(b) by 149 days.

(21) Appl. No.: 12/958,700

(22) Filed: Dec. 2, 2010

(65) Prior Publication Data
US 2012/0144309 A1 Jun. 7, 2012

(51) Int. Cl.
G06F 3/048 (2013.01)
G06F 3/00 (2006.01)
G06F 3/0481 (2013.01)
G06F 17/30 (2006.01)

(52) U.S. Cl.
CPC ............ G06F 3/04815 (2013.01); G06F 17/30 (2013.01); G06F 17/30864 (2013.01); Y10S 715/961 (2013.01); Y10S 707/99935 (2013.01)
USPC ........... 715/764; 715/961; 715/739; 715/848; 707/E17.108; 707/E17.107; 707/999.005

(58) Field of Classification Search
CPC . G06F 3/048; G06F 3/04815; G06F 3/30483; G06F 17/30; G06F 17/30864; G06F 17/30867
USPC .......... 715/961, 764, 739, 848; 707/E17.108, 707/E17.107, 999.005
See application file for complete search history.

(56) References Cited

U.S. PATENT DOCUMENTS

| | | | | |
|---|---|---|---|---|
| 5,515,488 A * | 5/1996 | Hoppe et al. | ................. | 345/440 |
| 6,473,751 B1 * | 10/2002 | Nikolovska et al. | .................. | 1/1 |
| 6,505,194 B1 * | 1/2003 | Nikolovska et al. | .......... | 707/768 |
| 6,910,031 B2 * | 6/2005 | Ohtomo | ................................ | 1/1 |
| 7,318,199 B2 * | 1/2008 | Nickolayev et al. | .......... | 715/735 |
| 7,475,072 B1 * | 1/2009 | Ershov | ................... | 1/1 |
| 7,710,423 B2 * | 5/2010 | Drucker et al. | ................ | 345/474 |
| 7,721,311 B2 * | 5/2010 | Kowald et al. | ................. | 725/52 |
| 7,814,115 B2 * | 10/2010 | White et al. | .................. | 707/765 |
| 7,958,107 B2 * | 6/2011 | Curtis | ........................... | 707/706 |
| 8,037,166 B2 * | 10/2011 | Seefeld et al. | ................ | 709/223 |

(Continued)

OTHER PUBLICATIONS

Spoerri, InfoCrystal: A visual tool fro information retrieval. 1993, pp. 150-157.*

(Continued)

*Primary Examiner* — Ece Hur
(74) *Attorney, Agent, or Firm* — Fish & Richardson P.C.

(57) ABSTRACT

A plurality of digital resources are identified in a set of digital resources. An indication of a user selection of at least one criteria is received, the user selection received through a user interface. A degree of correlation is determined between each digital resource in the plurality and each of the criteria. Data is sent that is configured for use in presenting, in a window of the user interface, a plurality of graphical resource objects and at least one graphical attractor object, each graphical resource object representing a digital resource in the plurality of digital resources and each graphical attractor object representing one of the criteria. Each resource object is presented a distance from each attractor object, the distance based at least in part on the corresponding degree of correlation between the digital resource represented by the resource object and the criteria represented by the attractor object.

18 Claims, 10 Drawing Sheets
(5 of 10 Drawing Sheet(s) Filed in Color)

(56) References Cited

U.S. PATENT DOCUMENTS

| | | |
|---|---|---|
| 8,244,705 B1 * | 8/2012 | Lettau et al. .................. 707/706 |
| 8,260,786 B2 * | 9/2012 | DeCoste et al. ............. 707/748 |
| 8,375,053 B2 * | 2/2013 | Curtis .......................... 707/780 |
| 8,375,334 B2 * | 2/2013 | Nakano et al. ................ 715/848 |
| 2002/0018074 A1 * | 2/2002 | Buil et al. ..................... 345/719 |
| 2003/0126601 A1 * | 7/2003 | Roberts et al. ................. 725/37 |
| 2005/0203924 A1 * | 9/2005 | Rosenberg ................... 707/100 |
| 2006/0155684 A1 * | 7/2006 | Liu et al. .......................... 707/3 |
| 2007/0073748 A1 * | 3/2007 | Barney ......................... 707/101 |
| 2007/0288498 A1 * | 12/2007 | Dietz et al. ................... 707/102 |
| 2008/0229223 A1 * | 9/2008 | Kake ............................. 715/764 |
| 2009/0100019 A1 * | 4/2009 | White et al. ...................... 707/3 |
| 2009/0249254 A1 * | 10/2009 | Walker ......................... 715/834 |
| 2009/0282027 A1 * | 11/2009 | Subotin et al. ................... 707/5 |
| 2010/0125540 A1 * | 5/2010 | Stefik et al. .................... 706/12 |
| 2012/0144309 A1 * | 6/2012 | Zendler et al. ............... 715/739 |
| 2013/0117260 A1 * | 5/2013 | Barrett et al. ................. 707/722 |

OTHER PUBLICATIONS

Wiza et all., "Periscope—A System for Adaptive 3D Visualization of Search Results". Apr. 2004, pp. 29-40, 180. FIGs. 12-16.*

* cited by examiner

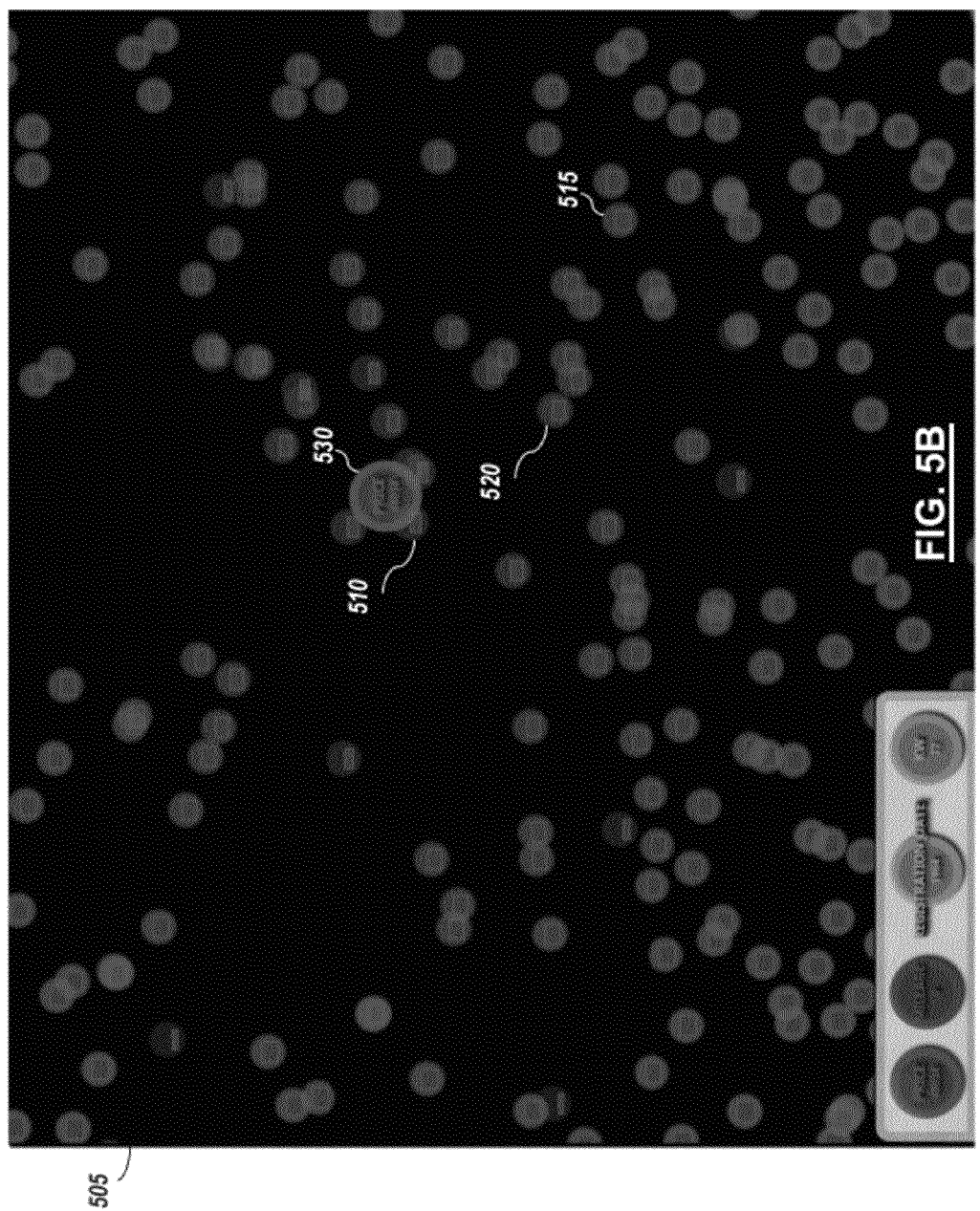

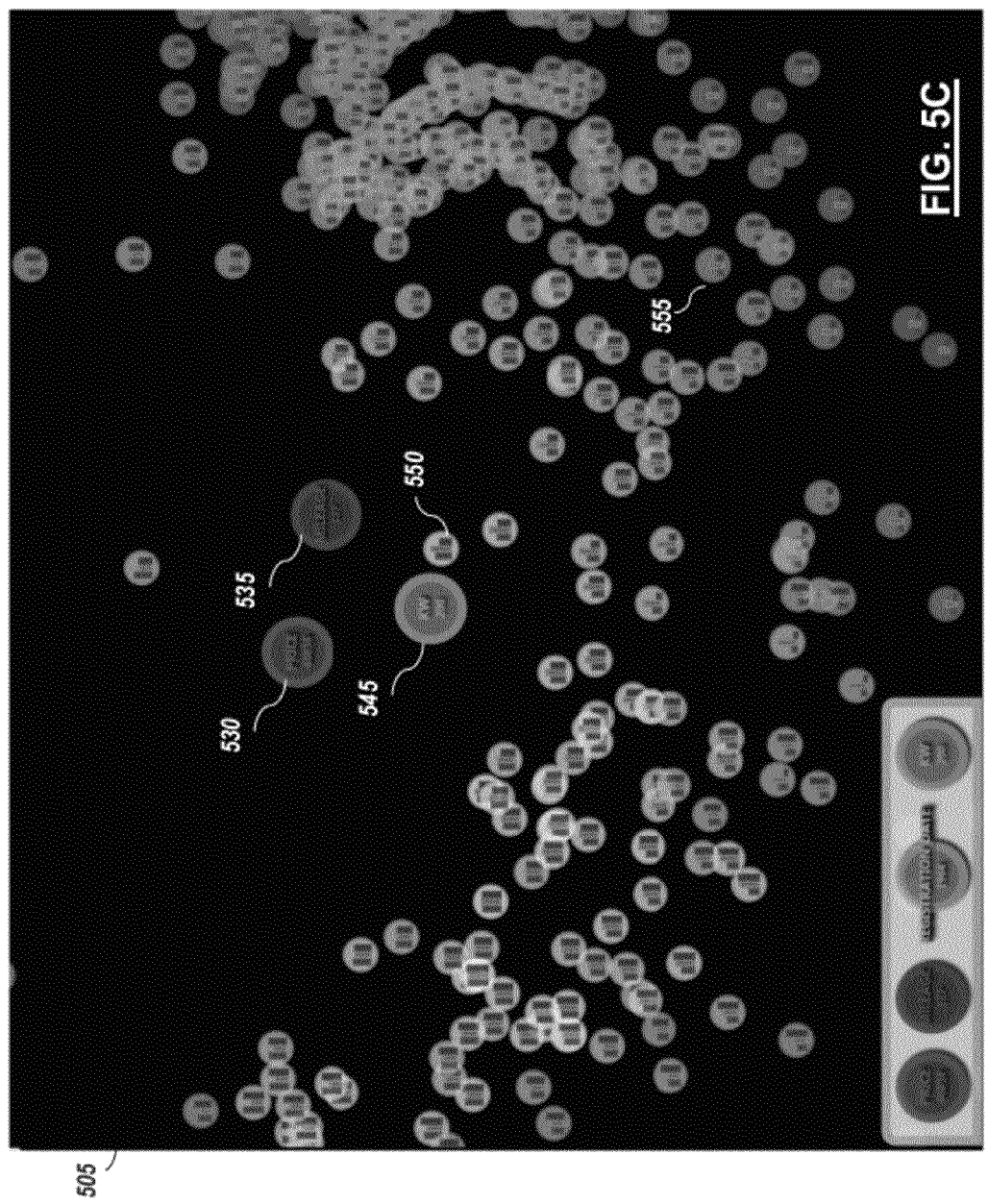

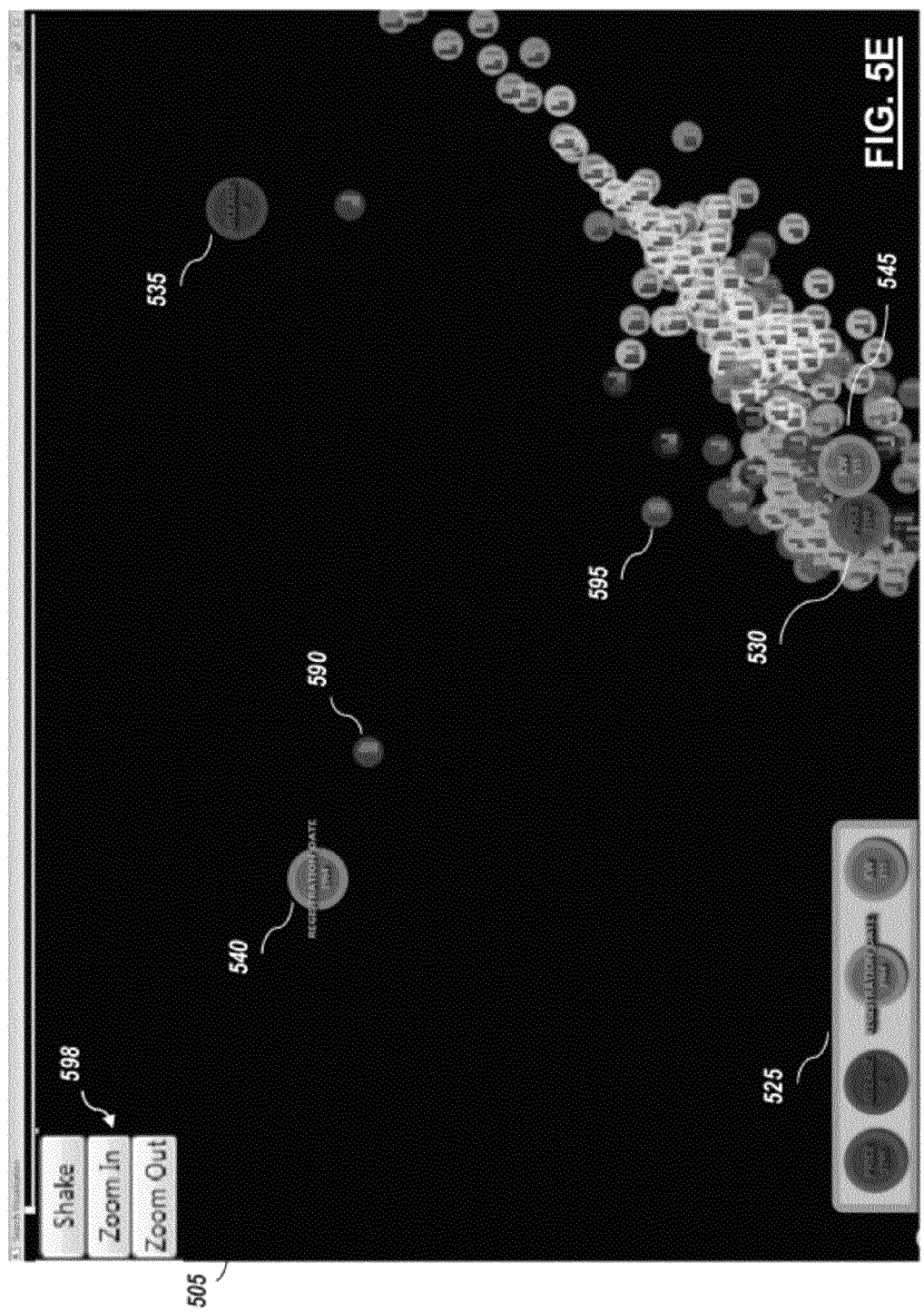

ATTRACTION-BASED DATA VISUALIZATION

TECHNICAL FIELD

The present disclosure relates to data visualization technology, and, more particularly, visualizing a set of digital resources using one or more objects modeling attraction forces.

BACKGROUND

Search engines exist that assist computer users in finding digital resources stored on one or more computing systems, including a network of computing systems, such as the Internet. With the advent of the Internet, search engines have grown in speed and functionality, to accommodate demand for finding the billions of resources stored in computing systems connected across the Internet. Web search engines, for instance, are search engines designed to search for information on the Internet. Typically, a user submits a search query specifying certain keywords, criteria, or conditions and the search engine consults an index to determine which resources, known to the search engine, likely satisfy the search query. Results of the search, also known as "hits," can be returned to the user. In some cases, the user can access or request the resources included in a listing of hits directly from the listing. In some cases, depending on the search query and the search algorithm employed by the search engine, thousands, even millions, of hits can be returned in response to a search. Solutions have been developed to assist users in navigating sets of search results with large numbers of hits, as users rarely navigate through each and every search result returned by the search engine. In some instances, existing search engines return an ordered listing of search results, the listing ordered according to relevance of the search results, as determined by the search engine.

SUMMARY

This disclosure provides various embodiments for visualizing a set of digital resources using an interactive viewer tool. A plurality of digital resources can be identified in a set of digital resources stored in at least one computer-readable storage medium. An indication of a user selection of at least one criteria can be received, the user selection received through a user interface of a computing device. A degree of correlation can be determined, for each digital resource in the plurality of digital resources, between the digital resource and each of the at least one criteria. Data can be sent that is configured for use in presenting, in a window of the user interface of the computing device, a plurality of graphical resource objects and at least one graphical attractor object, each graphical resource object in the plurality of graphical resource objects representing a digital resource in the plurality of digital resources and each graphical attractor object representing one of the at least one criteria. Each resource object can be presented a distance from each attractor object, the distance based at least in part on the corresponding degree of correlation between the digital resource represented by the resource object and the criteria represented by the attractor object. In some aspects, each attractor object can model an attraction force applied to each resource object presented together with the attractor object, each attraction force having a magnitude based at least in part on the corresponding degree of correlation between the digital resource represented by the resource object and the criteria represented by the attractor object.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

FIGS. 5A-5E are example screenshots of a user interface presenting a visualization of a set of digital resources relative to one or more criteria using at least one attractor object.

Like reference symbols in the various drawings indicate like elements.

DETAILED DESCRIPTION

This disclosure generally describes software, computer-implemented methods, and systems relating to visualizing a set of digital resources. More particularly, among other aspects, a data visualizer system is described, adapted to assist users in visualizing trends, relationships, and characteristics of a set of digital resources. The set of digital resources can be graphically represented as objects. The digital resources can be compared, filtered, or assessed against one or more criteria and/or criteria values, to allow the user to distinguish the digital resources from one another, analyze or identify characteristics of the digital resources, and to identify one or more particular digital resources in the set (e.g., a subset of resources most closely satisfying a set of criteria). The relationship between digital resources and criteria can be modeled through the interaction of graphical resource objects representing the digital resources and graphical attractor objects representing the criteria. The attractor objects can model an attractive or repelling force acting upon the resource objects, the level of attraction/repulsion between a resource object and an attractor object representing the degree of correlation (or relative degree of correlation) between the corresponding digital resource and criteria modeled by the resource and attractor objects. A visualization presentation generated using these or similar principles and/or functionality can be provide a more intuitive, enjoyable, and visual alternative to typical methods of sorting, searching, or skimming through sets of data.

Figure 1:
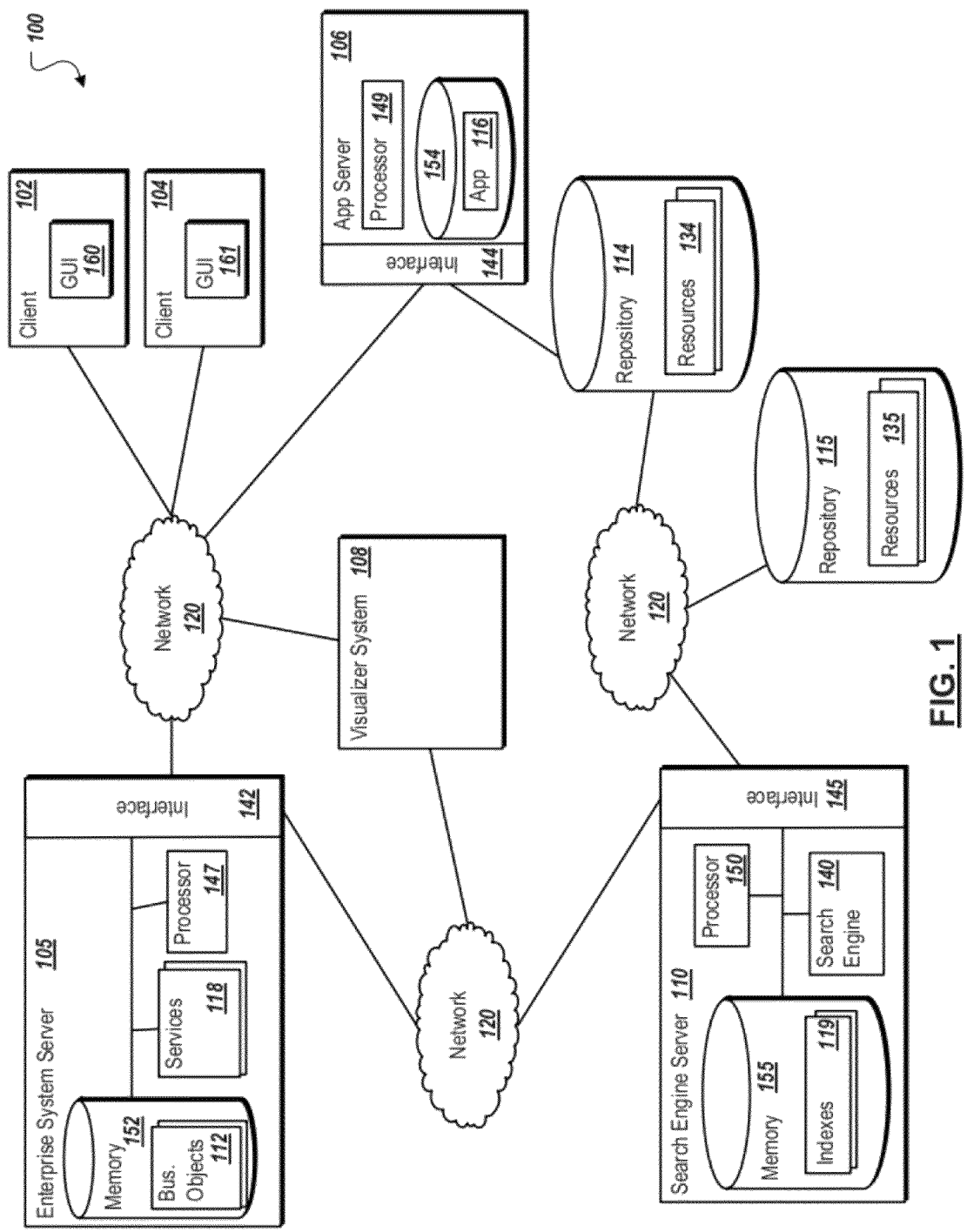
FIG. 1 illustrates an example system for providing data visualization for a set of digital resources.

Turning to the particular example implementation of FIG. 1, the illustrated software environment 100 includes, or is communicably coupled with, one or more clients 102, 104, one or more enterprise system servers 105, one or more application servers 106, a visualizer system 108, a search engine server 110, and one or more repositories 114, 115, using one or more networks 120. Each of the servers (e.g., 105, 106, 110) comprise electronic computing devices operable to receive, transmit, process, store, or manage data and information associated with the software environment 100. As used in this document, the term "computer" or "computing device" is intended to encompass any suitable processing device. For example, the environment 100 may be implemented using computers other than servers, including a server pool. Further, any, all, or some of the servers (e.g., 105, 106, 110) may be adapted to execute any operating system, including Linux, UNIX, Windows Server, or any other suitable operating system.

In the illustrated embodiment, a visualizer system 108 can be provided that is adapted to provide functionality for organizing, filtering, and/or sorting a set of data through a data visualization scheme. For instance, the visualization scheme can be based on modeling digital resources (e.g., web pages, business objects, electronic documents, online data, and other files and data) as graphical objects and further modeling the relationship between the digital resources and one or more criteria forming the basis of the organizing, filtering, or sorting of the data. Additionally, the one or more criteria can also be modeled as graphical objects. The relationship between the digital resources and criteria can further be modeled according to an interaction between the respective objects representing the resources and the objects representing the criteria. For instance, a degree of correlation between the resource and the criteria can be modeled by objects representing the resources and the objects representing the criteria. In some instances, the relationship (such as the degree of correlation) between a particular digital resource and a particular criteria can be modeled via the arrangement of the resource object, representing the resource, and the criteria object representing the particular criteria, in a presentation of the objects together on a user interface of a computing device, such as clients 102, 104. In other examples, the relationship between digital resources and criteria can be modeled via interaction between resource objects, representing the digital resources, and criteria objects representing the criteria. For example, criteria objects can model an attraction force, such as a magnetic force, attracting or repelling certain resource objects depending on the underlying relationship between the criteria modeled by the criteria object and the digital resource represented by the attracted (or repelled) digital resource.

The functionality of the visualizer system 108 can be provided through one or more computing devices executing instructions stored on one or more machine-readable storage devices or memories. In some instances, all or a portion of the visualizer system 108 can be executed on and be local to the client device whereon the corresponding visualization will be presented. In some examples, at least a portion of the functionality of the visualizer system 108 can be served by one or more computing devices remote from the client device presenting the visualization. For example, at least a portion of the visualizer system 108 can be served to clients 102, 104 over a network 120 by a remote server, such as search engine server 110, enterprise system server 105, or another remote computing device. Indeed, in some implementations, various visualizer system logic can be provided by one or more computing devices, including visualization user interface logic (e.g., animation logic, distance calculation logic, attractor object logic, resource object logic, object color-coding logic), resource-criteria correlation logic, criteria set identification logic, and other logic utilized by the visualizer system 108.

Visualizer system 108 can be used in connection with one or more search engines 140 to assist in visualizing search results returned by the search engine for one or more search queries. Search functionality can be provided through a search engine 140 hosted by search engine server 110, the search engine 140 adapted to search digital resources 118, 134, 135 hosted by or stored at a plurality of data repositories (e.g., 152, 114, 115), including other computing and software systems (e.g., 106). The search engine 140 can use one or more search indexes 119 to assist in generating search results relating to a search of a corpus of digital resources stored or maintained by one or more data repositories. In some examples, the search engine 140 can be used in connection with an enterprise software system providing, managing, or otherwise utilizing a plurality of business objects 112 in connection with services 118 provided by the enterprise software system. The enterprise system server 105 can be one or more computing devices used to provide enterprise software services 118 to one or more customers, such as clients 102, 104, or application servers (e.g., 106). In one example, a user may be interested in finding a particular business data object among a corpus of thousands or millions of business objects 112. A search can be performed on the corpus of business objects, for example, using a search engine 140, and the search results visualized by the visualizer system 108 to assist the user in determining which business objects 112 are most relevant to the user's purpose or project.

Figure 2:
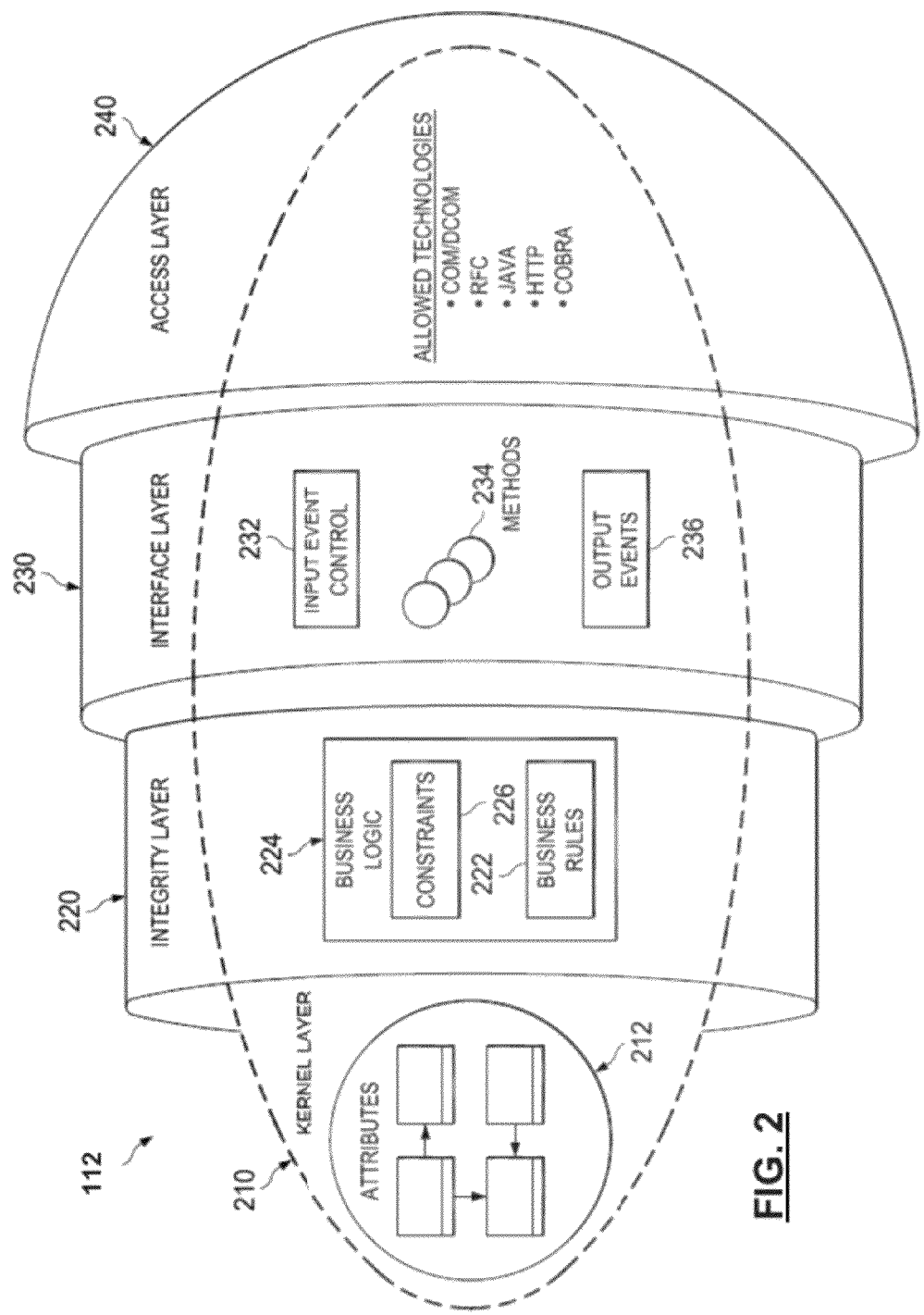
FIG. 2 is a schematic representation of one business object architecture for use by an appropriate system, such as the system described in FIG. 1.

FIG. 2 illustrates the structure of a generic business object 112 in environment 100. In general, the overall structure of the business object model can ensure the consistency of the interfaces that are derived from the business object model. The derivation helps ensure that the same business-related subject matter or concept can be represented and structured in the same way in various interfaces. The business object model can define the business-related concepts at a central location for a number of business transactions. In other words, it reflects the decisions made about modeling the business entities of the real world acting in business transactions across industries and business areas. The business object model can be defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure. In some instances, a plurality of packaged or grouped business objects can be visualized by the visualizer system 108 as a group, to discover business objects, within the grouping, that satisfy or best correspond to certain criteria.

A business object may be defined such that it contains multiple layers, such as in the example business object 112 of FIG. 2. The example business object 112 contains four layers: the kernel layer 210, the integrity layer 220, the interface layer 230, and the access layer 240. The innermost layer of the example business object is the kernel layer 210. The kernel layer 210 represents the business object's 112 inherent data, containing various attributes 212 of the defined business object. Attributes of a business object can be used to map the business object to certain criteria for use in visualizing the business object. Indeed, in some examples, a visualizer system 108 can identify common attributes among a set of business objects to identify a set of criteria for use during the visualization of the set of business objects using the visualizer tool 108.

The second layer represents the integrity layer 220. In the example business object 112, the integrity layer 220 contains the business logic 224 of the object. Such logic may include business rules 222 for consistent embedding in the environment 100 and the constraints 226 regarding the values and domains that apply to the business object 112. Business logic 224 may comprise statements that define or constrain some aspect of the business, such that they are intended to assert business structure or to control or influence the behavior of the business entity. It may pertain to the facts recorded on data and constraints on changes to that data. In effect, business logic 224 may determine what data may, or may not, be recorded in business object 112a. The third layer, the interface layer 230, may supply the valid options for accessing the business object 112 and describe the implementation, structure, and interface of the business object to the outside world. To do so, the interface layer 230 may contain methods 234, input event controls 232, and output events 236. The fourth and outermost layer of the business object 112 in FIG. 2 is the access layer 240. The access layer 240 defines the technologies that may be used for external access to the business object's 112 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 112 of this embodiment may implement standard object-oriented technologies such as encapsulation, inheritance, and/or polymorphism.

Returning to FIG. 1, a search engine server 110 can include one or more processors 150 executing software comprising the search engine 140. The processor 150 executes instructions and manipulates data to perform search engine 140 operations and tasks (described below) as well as serve development artifact search services to a plurality of search service consumers, including applications (e.g., 116), systems, and programs remote from the search engine server 110. One or more search indexes 119, stored in memory 155, can be generated, managed, accessed, and otherwise used by the search engine 140 to provide development artifact search services. The search engine server 110 can be adapted to serve development artifact searching to consumers in a variety of contexts including local, private, distributed, enterprise, and cloud-computing software system environments. The search engine server 110 can be implemented using a single processor 105 or multiple processors, including multiple processors operating in a network or pool of computing devices, including parallel processing and cloud computing environments.

A plurality of repositories 114, 115, 152 storing digital resources 112, 134, 135 can be searched by search engine 140. The repositories 112, 114, 115 can, in some instances, be associated with computing devices and systems, such as systems and applications responsible for creating, modifying, serving, and managing the digital resources 112, 134, 135. For instance, a repository 114 and development artifacts 134 can be associated with a particular application server 106 (such as a web server), and in some cases associated computing systems and devices can create and manage at least a portion of the digital resources maintained by the associated repository. In some instances, repositories (e.g., 152) can be a part of or otherwise associated with an enterprise software system (e.g., 105) including users and consumer clients (e.g., 102, 104, 108) of the enterprise software system. Repositories can also be searched that are remote from or are not directly associated with the enterprise software system or search engine server 110, including repositories maintaining digital resources created, served, and managed by third-party entities or repositories implemented on computing devices within a cloud computing environment.

In the present example, servers, including enterprise system servers 105, application servers 106, search engine servers 110, and server devices otherwise associated with or serving a portion of visualizer system 108 can each include at least one interface (e.g., 142, 144, 145), one or more processors (e.g., 147, 149, 150), and computer-readable memory (152, 154, 155). In some instances, some combination of enterprise system servers 105, application servers 106, search engine servers 110, and visualizer system 108 computing devices can be hosted on a common computing system, server, or server pool, and share computing resources, including shared memory, processors, and interfaces. The interfaces (e.g., 142, 144, 145) can be used for communicating with other systems in a client-server or other distributed environment (including within environment 100) connected to the network 120, for example the one or more clients 102, 140, repositories 114, 115, or any other computing device adapted to interface with the servers, including devices not illustrated in FIG. 1. Generally, each interface (e.g., 142, 144, 145) can comprise logic encoded in software and/or hardware in a suitable combination and operable to communicate with the network 120. More specifically, interfaces may comprise software supporting one or more communication protocols associated with communications such that the network 120 or hardware is operable to communicate physical signals within and outside of the illustrated software environment 100.

Each of the example servers (e.g., 105, 106, 110), as well as visualizer system 108, can include one or more processors (e.g., 147, 149, 150). Each processor can execute instructions and manipulates data to perform the operations of the associated server or system, and may comprise, for example, a central processing unit (CPU), a blade, an application specific integrated circuit (ASIC), or a field-programmable gate array (FPGA), among other suitable options. Although each processor 147, 149, 150 illustrated in FIG. 1 is shown as a single processor, multiple processors may be used according to the particular needs of the associated server. References to a single processor 147, 149, 150 are meant to include multiple processors where applicable. The operations that each processor executes are determined by the purpose and operations of its associated server. Generally, the processor executes instructions and manipulates data to perform the operations of its respective server and, specifically, the software systems, services, and applications hosted by the servers (e.g., 105, 106, 110).

At a high level, each "server" (e.g., 105, 106, 110) includes one or more electronic computing devices operable to receive, transmit, process, store, or manage data and information associated with the environment 100. Specifically, a server is responsible for receiving requests from one or more clients and sending the appropriate response the requesting client. In addition to requests from external clients, requests may also be sent from internal users, external or third-party customers, other automated applications, as well as any other appropriate entities, individuals, systems, or computers. For example, although FIG. 1 illustrates a single server for each of enterprise system server 105, application server 106, and search engine server 110, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the case of an application server 106, the processor 149 can execute the functionality required to receive and respond to requests from clients, as well as client applications interfacing with the server's hosted application 116. It will be understood that the term "application server" (e.g., 106) can include any suitable software component or module, or computing device(s) capable of hosting and/or serving a software application, including distributed, enterprise, or cloud-based software applications. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, functions, procedures, methods, or other processes, or may instead include a number of sub-modules, third party services, components, libraries, and such, as appropriate. Conversely, the features and functionality of various components can be combined into single components as appropriate.

At a high level, each of the one or more hosted applications and services (e.g., 116, 118, 140) illustrated in the environment 100 can include any application, program, module, process, or other software that may execute, create, change, delete, generate, or otherwise manage information according to the present disclosure, particularly in response to and in connection with one or more requests received from the illustrated clients 102, 104, as well as other applications (e.g., 116). In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via the network 120 (e.g., through the Internet, or within internal networks such as intranets). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client (e.g., 102, 104). Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

Each of the example servers (e.g., 105, 106, 110) can also include a memory (152, 154, 155, respectively). Further, repositories 112, 114, 115 can also each have at least one associated memory device. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as firmware logs and policies, firewall policies, a security or access log, print or other reporting files, as well as others. Again, the particular data and instructions stored in each memory (e.g., 152, 154, 155) will be described in detail below in connection with the illustrated implementations of the software environment 100 and components thereof.

Generally, a network 120 facilitates wireless or wireline communications between the components of a software environment 100 (e.g., between the search engine server 110 and development artifact repositories (e.g., 112, 114, 115), between the visualizer system 108 and one or more clients 102, 104, the consumer clients (e.g., 102, 104) and the search engine server 110 and enterprise system server 105, the visualizer system 108 and the search engine server 100, as well as between other components as appropriate), as well as with any other local or remote computer, such as those associated with one or more applications, systems, or external data sources. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. As an example, in FIG. 1 networks 120 may represent a portion of an enterprise network, or a connection to the Internet. In some instances, a portion of the network 120 may be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 102, 104. A client 102, 104 can be any computing device operable to connect or communicate at least one server (e.g., 105. 106, 110) and/or the network 120 using a wireline or wireless connection. Each client 102, 104 includes a GUI 160, 161. In general, the client 102, 104 comprises an electronic computing device operable to receive, transmit, process, and store any appropriate data associated with the software environment of FIG. 1. It will be understood that there may be any number of clients 102, 104 associated with environment 100, as well as any number of clients 102, 104 external to environment 100. Further, the term "client" and "user" may be used interchangeably as appropriate without departing from the scope of this disclosure. Moreover, while each client 102, 104 is described in terms of being used by one user, this disclosure contemplates that many users may use one computer or that one user may use multiple computers. As used in this disclosure, the client 102, 104 is intended to encompass a personal computer, touch screen terminal, workstation, network computer, kiosk, wireless data port, portable notepad computer, smart phone, personal data assistant (PDA), one or more processors within these or other devices, or any other suitable processing device. For example, the client 102, 104 may comprise a computer that includes an input device, such as a keypad, touch screen, mouse, or other device that can accept information, and an output device that conveys information associated with operations of one or more applications stored and/or executed on an application server (or other servers in environment 100) or on the client 102, 104 itself, including digital data, visual information, or the GUI 160, 161. Both the input device and the output device may include fixed or removable storage media such as a magnetic computer disk, CD-ROM, or other suitable media to both receive input from and provide output to users of the clients 102, 104 through the display, namely the GUI 160, 161.

The GUI 160, 161 comprises a graphical user interface operable to allow the user to interface with at least a portion of environment 100 for any suitable purpose, including allowing a user to interact with one or more software applications or systems, including a visualizer system 108, search engine 140, enterprise services 118, or other applications (e.g., 116). Generally, the GUI 160, 161 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 160, 161 can be any graphical user interface, such as a native rich client, web browser, touch screen, or command line interface (CLI) that processes information in the environment 100 and efficiently presents the results to the user. In general, the GUI 160, 161 may include a plurality of user interface (UI) elements such as interactive fields, pull-down lists, media players, tables, graphics, virtual machine interfaces, buttons, etc. operable by the user at the client 108. These UI elements may be related to the functions of one or more applications, systems, or services (e.g., 108, 116, 118, 140), including applications hosted locally at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 3:
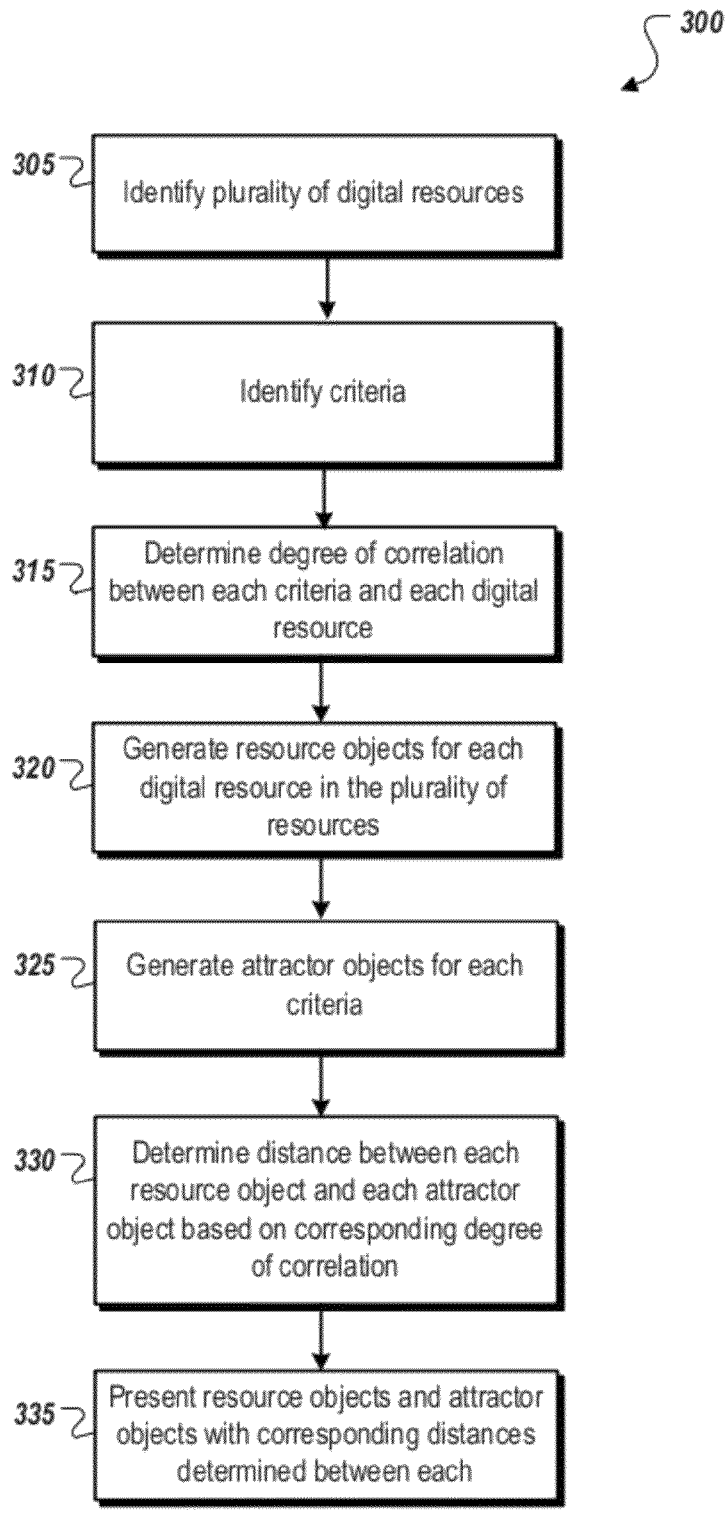
FIG. 3 is a flowchart of an example technique for generating a visualization of a set of digital resources relative to one or more criteria.

Turning now to the flowchart 300 of FIG. 3, an example technique is shown for generating a visualization of a set of digital resources relative to one or more criteria. A plurality of digital resources can be identified 305 among a set or corpus of digital resources. The resources can be identified 305, for example, through a search by a search engine (such as a search of the Internet for web resources hosted by web servers), identifying a database, folder, or other repository of resources, or by filtering or sorting a set of digital resources, among other examples. One or more criteria can also be identified 310 to compare or assess the identified digital resources. The criteria can be selected or identified by a user, or can be automatically selected, for example, by using a computer to identify one or more criteria common to the identified digital resources.

With the plurality of digital resources identified 305 and a set of one or more criteria selected 310, a degree of correlation between each criteria and each digital resource can be determined. Determining 315 a degree of correlation between a given criteria and a given digital resource can include comparing a value associated with or included in the digital resource with a particular target value specified for the criteria. For instance, the criteria can be a creation date of the digital resource, with the value of the criteria set to a certain value, such as a particular date, date range, or a minimum or maximum value. Graphical resource objects can be generated 320 to model and represent each digital resource, including characteristics of the digital resource, in a presentation window of a graphical user interface corresponding to the visualization. Graphical resource objects can be hyperlinked to the represented digital resource or a source of the digital resource. Additional graphical objects can be generated 325 to model and represent the identified criteria. In some examples, the generated criteria objects can be attractor objects adapted to model an attractive force on the plurality of generated resource objects. The attractor objects can attract or repel the resource objects presented in the presentation window with the attractor objects to represent a corresponding to degree of correlation between the individual digital resource represented by the corresponding resource object and the criteria represented by the attractor object. Modeling interaction between the criteria objects and resource objects can include determining 330, for the visualization presentation 335, a distance between each resource object and each criteria object. For instance, the criteria objects can be fixed in their locations relative to the resource objects, and placing or moving the criteria objects within the window can affect the position of the resource objects, depending on the degree of correlation between the underlying digital resources and criteria. For instance, resource objects representing digital resources with a stronger degree of correlation to a particular criteria can be modeled as more attracted to (and thereby closer to) criteria objects representing the criteria. Conversely, digital resources with a weaker degree of correlation to the criteria can be represented by resource objects displayed further away (or repelled) from the criteria attractor object representing the criteria.

Figure 4:
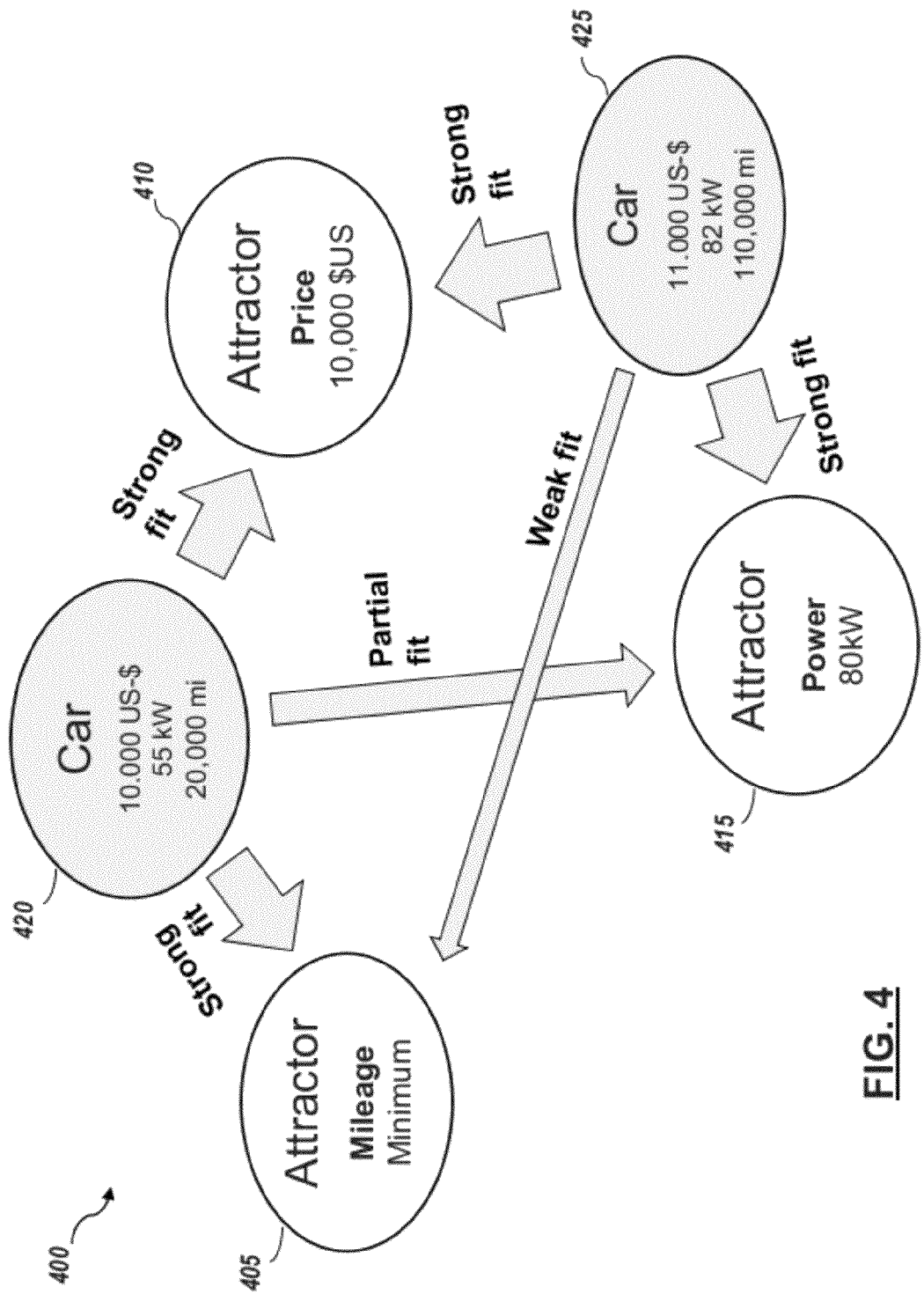
FIG. 4 illustrates a simplified example of a data visualization scheme including at least one attractor object.

FIG. 4 depicts a simplified, illustrative example of a visualization presentation 400 including one or more criteria attractor objects 405, 410, 415 and a plurality of resource objects (e.g., 420, 425). An attractor object 405 can represent a specified criteria relating to mileage of an automobile, the value of criteria specifying a minimum mileage number (i.e., so as to find automobiles with the lowest mileage). A second attractor object 410 can represent a criteria for price, the value set to $10,000. Further, a third attractor object 415 can represent a selected criteria for engine power of an automobile, the value of the criteria set to a value of 80 kW. A set of digital resources can be identified that relate to particular automobiles. The digital resources can be electronic records, web pages, business objects, or another type of digital resource describing features of a particular automobile. In the example of FIG. 4, a simplified set of two digital resources have been identified and resource objects 420, 425 generated representing the two resources. The first resource object 420 can represent a first digital resource describing a first automobile priced at $10,000, with a 55 kW engine, and 20,000 miles on its odometer. A second resource object 425 can represent a second digital resource describing a second automobile priced at $11,000, with a 82 kW engine, and 110,000 miles. The three attractor objects corresponding to mileage (405), price (410), and power (415) can be placed in a window presenting the first and second graphical resource objects 420, 425. The first and second resource objects can automatically realign or reposition in response to the introduction of the one or more attractor objects so that the resource objects are closer to those attractor objects for which a correlation exists between values of the digital resource and the value of the corresponding attractor object. For instance, as shown in FIG. 4, as both the first and second digital resources describe automobiles with a price near the target value of $10,000 specified by the second criteria represented by the second attractor object 410, both resource objects 420, 425 are positioned relatively close to the price attractor object 410 to show this strong degree of correlation on price. On the other hand, the first automobile has engine power significantly weaker than the target value specified for the power criteria. Consequently, resource object 420 is positioned a greater distance from the power attractor object 415 than the distance between the first resource object 420 and the mileage 405 and price 410 attractor objects for which there is relatively strong correlation between values associated with the underlying digital resource and the target values specified for the criteria underlying the mileage 405 and price 410 attractor objects. Similarly, as the mileage of the automobile described in the digital resource describing the second automobile is high, and the attractor object 405 represents a criteria specifying low mileage, the second resource object 425 is positioned away from the mileage attractor object 405, but close to the power attractor object 415 as the value of the engine power of the car represented by the second resource object 425 approximates the target value of the power criteria represented by the power attractor 415.

FIGS. 5A-5E illustrate screenshots of example implementations of a visualization presentation generated using an example visualizer system similar to those described and shown above. The examples shown and described in FIGS. 5A-5E continue with the automobile-related example described in connection with FIG. 4. While the examples relating to automobile-related digital resources and criteria described herein have been selected for purposes of illustration only, it should be appreciated that these are but non-limiting examples. Indeed, digital resources can represent a potentially infinite variety of subjects, including real world, theoretical, and imaginary objects, entities, persons, places, things, and concepts, as well as related criteria.

Figure 5A:
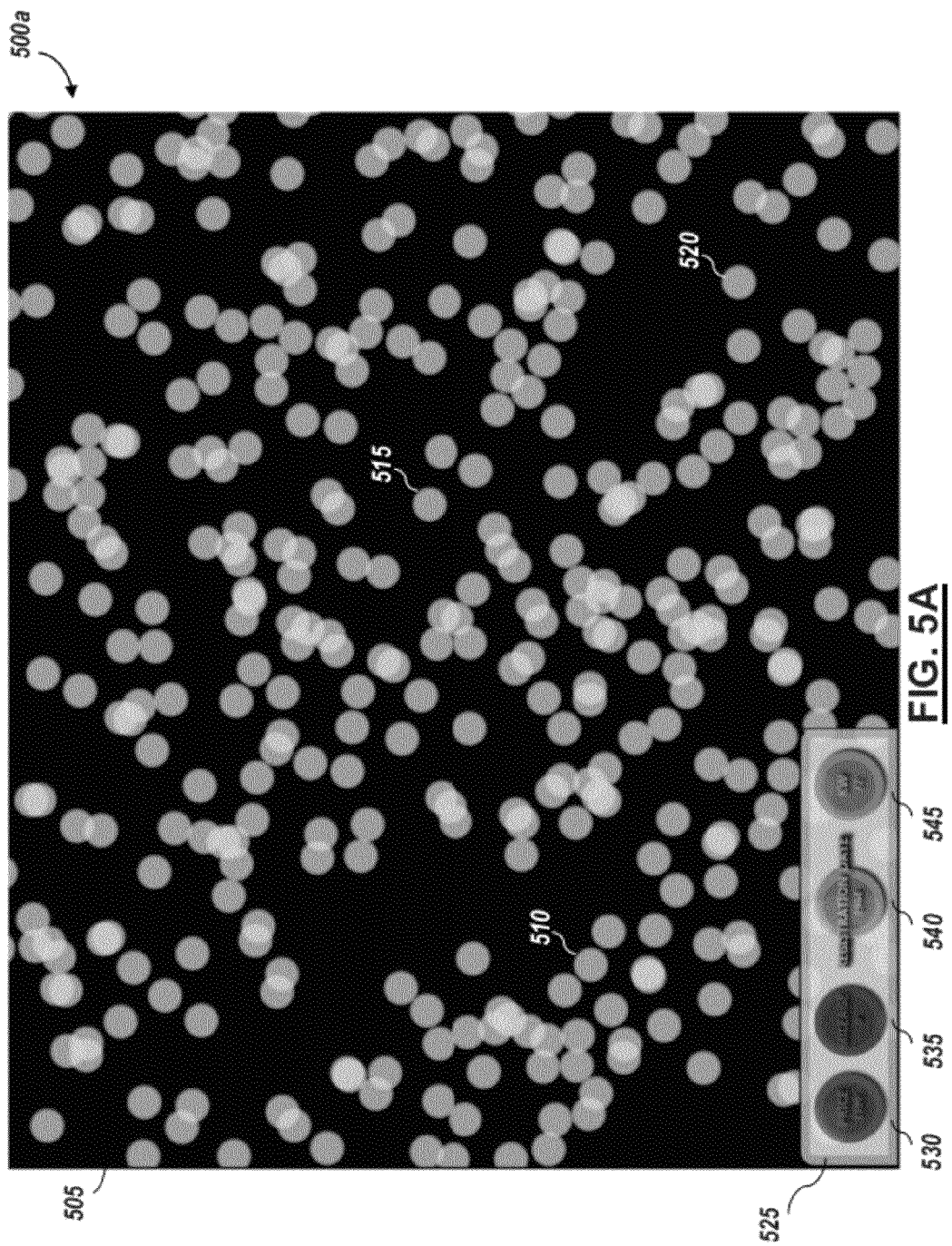

FIG. 5A shows a screenshot 500a showing a presentation window 505 including a plurality of resource objects (e.g., 510, 515, 520) distributed randomly in the window 505. Each resource object can represent a distinct digital resource. A user can specify how a set of resource objects should initially be presented in window 505. In some instances, resource objects can be presented in an ordered fashion to provide another layer of complexity to the presentation. For instance, the set of resource objects can be initially positioned in the window 505 according to values of the underlying resources or the type of the underlying resources. For example, resource objects representing a first type of resource can be initially presented on one half of the window and resources representing a second type of resource can be initially presented on the other half of the window to assist the user in tracking which resources are of which type, once attractor objects have been introduced into the window 505. In another example, resource objects can be initially positioned and ordered according to a preliminary score or determination of relevance. For example, the resource objects initially presented in a window 505 can pertain to a set of search results returned in response to a search. As is common in many modern searches, search results can be listed in an order according to their relative relevance to the search query. This information can be retained in the visualization presentation, for example, by ordering the initial presentation of the resource objects according to the initial search result order. Other schemes can also be adopted and used to initially organize resource objects prior to the introduction of attractor objects that can affect and change the initial positions of at least some of the resource objects presented in window 505. For example, user profile data or user preferences can be consulted by the system to initially position the resource objects in window 505. Indeed, user profile data and preferences can be used to affect other aspects of the visualizer system, including criteria presented for selection by the user, functionality of attractor objects (e.g., weighting of the attractor object) and resource objects (e.g., animation preferences), and other aspects of the visualizer system.

As shown in FIG. 5A, a tray 525 can be presented with a set of attractor objects 530, 535, 540, 545 for selection by the user and introduction into the window 505. By selecting one of the presented attractor objects 530, 535, 540, 545 a user can specify a particular criteria by which to analyze the set of digital resources represented by the plurality of resource objects (e.g., 510, 515, 520) presented in the visualizer window 505. An attractor object can be introduced to the window to act upon the set of resource objects in response to a user's selection of the attractor object. For instance, a user can click and drag a particular attractor object into a particular position in the window 505. For example, as shown in FIG. 5B, a user has placed a single attractor object 530 near the center of window 505, affecting the initial positions of the resource objects shown in FIG. 5A. For example, the introduction of attractor object 530 has displaced resource object 510 from its original position near the edge of the window 505 to a position near the center of the window and proximate the attractor object 530. This displacement can be the result of the digital resource, represented by resource object 510, being strongly correlated to the criteria represented by attractor object 530. In other words, resource object 510 has been attracted to attractor object 530. Other resource objects, such as those with a weaker correlation to the criteria modeled by the attractor object 530, have been repelled from the location of the attractor object 530, such as resource object 515.

As shown in FIG. 5B, in some examples, the introduction of an attractor object can also affect the color-coding of a particular resource object. Some resource objects can possess particular coloration based on certain characteristics of the underlying digital resource. In some instances, coloration of a resource object can represent the degree of correlation or a value of the underlying digital resource relating to one or more attractor objects introduced to the set of resource objects. In the example of FIG. 5B, attractor object 530 is color-coded red. When introduced to the set of resource objects, the resource objects can be color-coded and shaded to reflect the relationship of the underlying resource to the criteria modeled by the attractor object. For instance, resource objects can be shaded a brighter or darker shade according to the value of the underlying digital resource. In other instance, the brightness of a resource object's shade can provide a redundant indication of the underlying resource's degree of correlation with the criteria represented by the attractor object 530. This can be useful, for example, in assisting users in interpreting whether two resources have a similar degree of correlation, as sometimes, resources can have the same degree of correlation but be positioned on opposite sides of the attractor objects (but at similar radial distances from the attractor object) making it somewhat difficult for the user to compare the two resource objects. Hence, in an example where a resource object is shaded according to its degree of correlation with a criteria, a user can compare not only resource objects' distance from an attractor object, but also their shade to gauge the resource objects' relative degree of correlation with the criteria.

More complicated visualization tasks can be realized using a visualization presentation, including visualizations that include a simultaneous comparison of a plurality of different digital resources with a plurality of different criteria. For example, as shown in FIG. 5C, three attractor objects 530, 535, 545 have been positioned in window 505 together with the set of resource objects. Depending on the positioning of the different attractor objects, a user can visualize the relationship and characteristics of various digital resources in the set of digital resources. For example, as shown in FIG. 5C, a user has positioned the three attractor objects 530, 535, 545 somewhat close together. Resource objects, such as resource object 550, that remain close to the cluster of attractor objects 530, 535, 545, can be regarded as closely correlated with each of the criteria modeled by the attractor objects 530, 535, 545. Further, clusters of resource objects that correlate with one or more of the attractor objects' criteria can also be identified. For example, as resource objects such as resource object 555, are positioned on the same side as attractor objects 535 and 545, following the positioning of the attractor objects 530, 535, 545, a user can surmise that the digital resources (e.g., 555) represented by such resource objects are more closely correlated with the criteria of attractor objects 535 and 545 and less closely correlated to the criteria of attractor object 530, having migrated to the side of window 505 facing attractor objects 535 and 545 and opposed to attractor object 530.

Color-coding can also be used in visualizations involving multiple criteria attractor objects. For example, resource objects can be color-coded to reflect a digital resources correlation with multiple criteria. For instance, a resource object representing a digital resource can be color-coded with a color representing a mix of colors associated with attractor objects with whose criteria the resource objects' digital resource is most closely correlated. As an example, in one instance, attractor object 530 can be associated (and color-coded) red, while attractor object 535 is color-coded blue. A resource object that is more strongly correlated with attractor objects 530 and 535 can be color coded a violet color (i.e., mixing the red of attractor object 530 and blue of attractor object 535) to further enhance a user's visualization of the underlying digital resource's internal characteristics and relationship with the selected criteria modeled by the attractor objects. Resource objects can include other indicators and labeling. For instance, a resource object can be labeled by name, type, value, rank, score, preview, file size, etc. using words, symbols, graph objects, relative object size, and other visual indicators to further enhance the visualization presentation. For example, a bar graph indicator can be included in each resource object to indicate values or correlation degrees of the underlying digital resource as it pertains to the attractor objects' respective criteria.

Figure 5D:
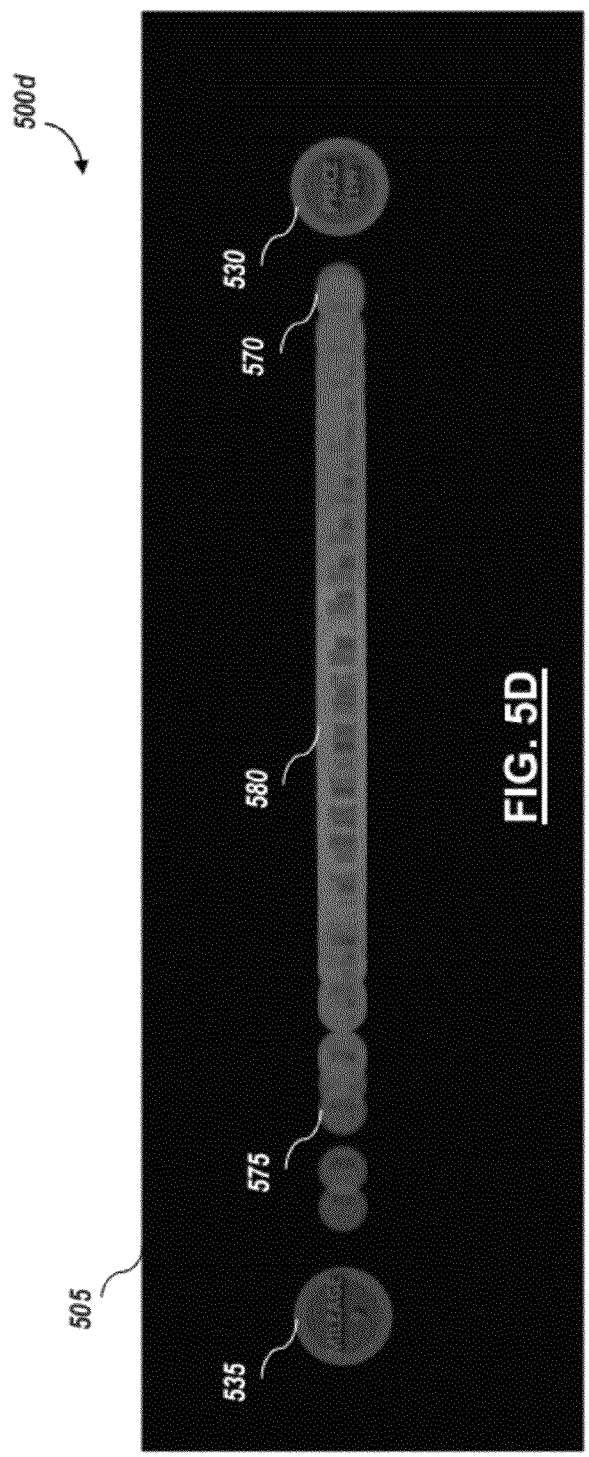

FIG. 5D illustrates another example of a visualization presentation. FIG. 5D shows an example screenshot 500d showing two attractor objects positioned near the edges of the window 505. In this example, the logic of the visualizer system can provide for the attractor objects to behave similar to attractive force objects, similar to magnets engaging ferromagnetic objects. To further enhance the visual interest of the visualization presentation, the interaction between stationary attractor objects and affected resource objects can model and simulate the physics of magnets of varying strengths interacting with movable objects possessing varying degrees of ferromagnetic qualities. As shown in FIG. 5D, the placement of two attractive force points (attractor objects 530 and 535) that attract (resource) objects according to different characteristics of the (resource) object, the resource objects align in a straight line defined by the two attractor objects. Further, the resource objects are aligned according to their relative attraction to each of the two attractor objects 530, 535. For instance, the digital resource of resource object 570 is significantly more correlated with attractor object's 530 criteria than with the criteria modeled by attractor object 535. Conversely, resource object 575 represents a stronger correlation to the criteria of attractor object 535 relative a corresponding degree of correlation with the criteria of attractor object 530. And in a third example, resource object 580 is positioned roughly equidistant from attractor objects 530 and 535, indicating that the degree of correlation between the digital resource modeled by resource object 580 and the two criteria corresponding to objects 530 and 535 is roughly the same. In this example, the distance of a resource object from an attractor object does not show the strength of its correlation with the attractor object's underlying criteria relative to the correlation of other resources, as in some of the previous examples. Instead, the distance between a resource object and an attractor object is a reflection of a digital resource's correlation with one criteria (modeled by a first attractor object) relative another (modeled by a second attractor object). Illustrated differently, while resource object 570 is positioned significantly closer to attractor object 530 in FIG. 5D than resource object 575, it may be the case that within the context of a visualization including only attractor object 530 (e.g., FIG. 5B), resource object 575 is positioned closer to attractor object 530 than resource 570. This would be so, in this example, because resource object 575, while having a stronger related degree of correlation with the criteria of attractor object 530 that resource object 570, has an even stronger degree of correlation with the criteria of attractor object 535.

In addition to modeling attraction forces on resource objects of differing characteristics, attractor objects, in some implementations, can also model attraction forces of varying magnitudes. In other words, attractor objects can be weighted, to correspond with differed weighting of the attractor objects' respective criteria. Criteria weighted more highly, or more important for a given comparison, analysis, or visualization, can result in an attractor object that models a greater attraction force than other attractor objects, all else being equal. For example, as shown in FIG. 5E, four attractor objects 530, 535, 540, 545 can be positioned in the window 505. The criteria modeled by attractor object 545 has been weighted higher than the criteria of the remaining attractor objects 530, 535, 540 positioned in the window 505. As a result, those resource objects whose digital resources possess strong degrees of correlation with the criteria of attractor 545 are pulled more dramatically toward attractor object 545. Using such an approach, a user can isolate particular resource objects (e.g., 595) correlating to one particular, highly-weighted criteria, or suggest a stronger preference or importance of one criteria over another. Attractor objects representing more highly-weighted criteria can model correspondingly stronger attraction forces. For example, while a particular resource object 590 may possess an equal (or even stronger) degree of correlation with the criteria represented by attractor model 530, the weighting of the criteria of attractor object 545 results in attractor object 545 out-pulling the attraction of attractor object 530 to bring the resource object 590 in closer proximity to attractor object 545 than attractor object 530. Indeed, in determining where to position a resource object and the relative distance of the resource object from the attractor objects also presented in the window 505, logic of the visualizer system can account for, not only the degree of correlation between the underlying digital resource and criteria, but also the relative degree of correlation between the resource and competing criteria, as well as the weighting of the criteria.

In some examples, a user can specify the weighting of particular criteria represented by attractor objects. A user can define the weighting by interacting with the attractor objects presented on the user interface or by pre-defining the weighting at the criteria-level. In one example, the user can change the weighting associated with a particular attractor object (and thus change the attractor object's modeled attraction force) by double-clicking on the attractor object, entering a weighing value, manipulate a weighting control, or some other mechanism. Indeed, in some implementations, a user can modify the weighting associated with an attractor object while the attractor object is presented together with a set of resource objects in a presentation window 505 of the user interface. In response, the visualization presentation can dynamically change to reflect the increased intensity of the attractor object's modeled attraction force.

Additionally, as shown in FIG. 5E, in addition to tray 525, additional tools, features, and utilities can be made available to a user of a visualizer system and presented in connection with window 505. For example, a toolbar 598 can be presented, allowing a user to dynamically change aspects of the visualization presentation. For example, a user can zoom in or out of or pan the view of the visualization presented in the window 505 in order to focus or view certain details of the presentation. A user can also change the positions of the resource objects included in the presentation, for example, by selecting a "shake" button. In implementations of the visualizer system presenting the visualization on a handheld client computer, a potentiometer or other motion-detecting device integrated in the handheld computer can detect a user shaking the handheld computer to trigger the shake function of the visualization system. A shake function can shuffle the positions of the resource objects. For instance, as shown in FIG. 5A, resource objects can be randomly positioned in window 505. This initial position can influence where resource objects are presented in subsequent views in the window, for example, views affected by the introduction of one or more attractor objects (such as in FIG. 5B). Accordingly, a user may wish to shuffle the position of the resource objects, for example, to disperse a cluster of resource objects and discovering hidden features, relationships, and characteristics of a digital resource set represented by the resource objects presented in the screen. Other tools and functionality can also be included, beyond those shown in described in connection with FIG. 5E, such as an attractor object search tool, attractor object strength/weighting control, filter tools to reduce the set of resource objects displayed in the window, and other tools and features.

Figure 6:
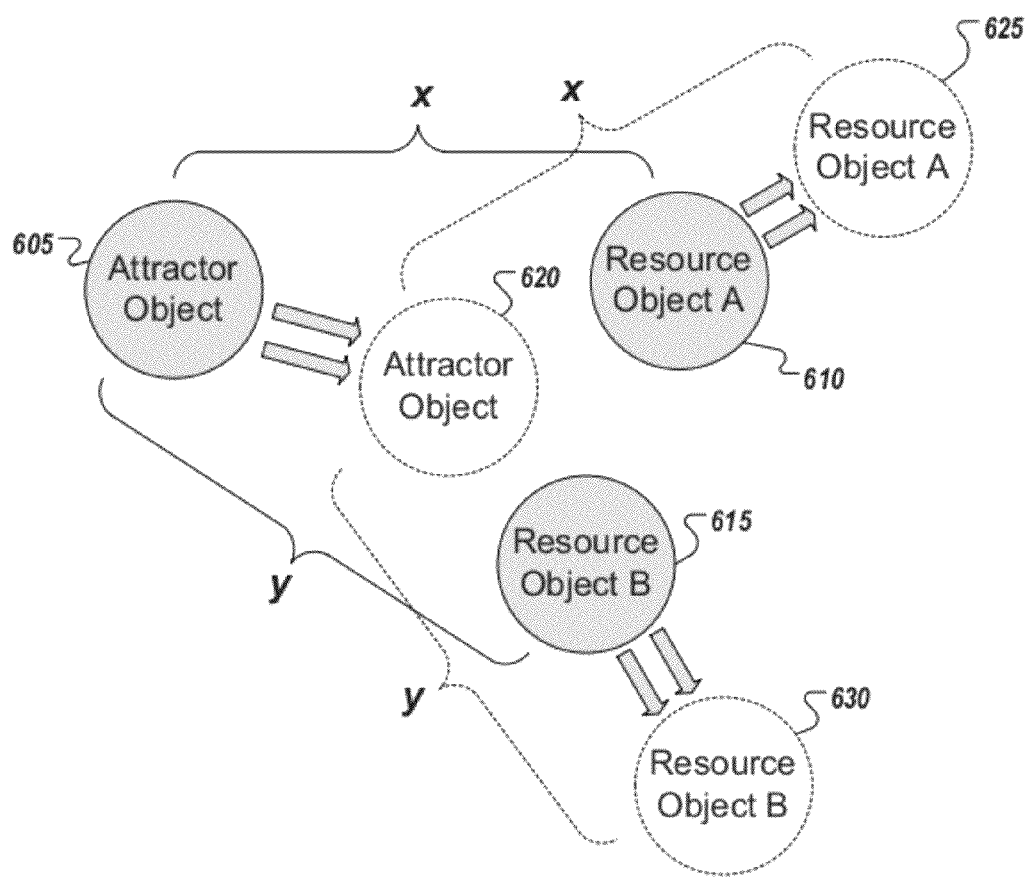
FIG. 6 illustrates a simplified example of an animation of resource objects in response to a movement of an attractor object.

In some implementation, the logic of the visualizer system can provide for resource objects to slide, drift, or otherwise move according to animation logic, so as to further enhance the aesthetics of the visualization presentation. For instance, a user can manipulate the position of an attractor object, sliding, moving, removing, or adding an attractor object to a visualization presentation window. For instance, as shown in FIG. 6, movement of an attractor object 605 to a second position 620 relative to resource objects 610, 615 presented together with the attractor object 605 can result in the resource objects 610, also being moved (and animated) as if the force moving the attractor object 605 were transmitted to the resource objects as a repelling force. Such a reaction and modeled animation can model behavior of like-poled magnets where one like-poled magnet is moved in relation to another like-poled magnet, repelling the second stationary magnet. Further, as shown in FIG. 6, the resource objects 610, 615 can be repelled in response to the movement of the attractor object 605 so as to maintain the same distance x, y between the resource object and the attractor object 605 as prior to the attractor object's 605 movement.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:
1. A computer-implemented method comprising:
displaying, in a user interface, a plurality of graphical resource objects representing a corresponding plurality of digital resources in a window, the plurality of digital resources stored in at least one computer-readable storage medium;
displaying, in the user interface, a tray adjacent the window;
displaying, in the tray, a plurality of graphical attractor objects representing a corresponding plurality of criteria, wherein each digital resource has a degree of correlation to each criteria;

receiving a user selection to transfer a first graphical attractor object and a second graphical attractor object from the tray into the plurality of graphical resource objects shown in the window, the user selection received through the user interface, the first graphical attractor object and the second graphical attractor object representing a first criterion and a second criterion, respectively;

in response to receiving the user selection, displaying the first graphical attractor object and the second graphical attractor object among the plurality of graphical resource objects; and automatically re-arranging respective positions of one or more of the plurality of graphical resource objects to be displayed at one or more distances from the first graphical attractor object and the second graphical attractor object, wherein each of the one or more distances is based at least in part on the corresponding degree of correlation between the digital resource represented by the graphical resource object in the window and the first and second criteria represented by the first and second graphical attractor objects.

2. The method of claim 1, wherein the computing device is a remote client computing device.

3. The method of claim 1, wherein the attractor object models an attraction force applied to each resource object presented together with the attractor object, each attraction force having a magnitude based at least in part on the corresponding degree of correlation between the digital resource represented by the resource object and the criteria represented by the attractor object.

4. The method of claim 3, wherein the attraction force of an attractor object is further based on a weighting of the criteria represented by the attractor object, wherein a higher weighting of a particular criteria corresponds to a higher attraction force of a particular attractor object, representing the particular criteria, on resource objects presented together with the particular attractor object.

5. The method of claim 4, wherein at least a first and a second criteria are selected and a first and a second attractor object presented with the resource objects, the first and second criteria having different weightings.

6. The method of claim 1, wherein each criteria includes at least one value and the degrees of correlation between the digital resources and each criteria are each based, at least in part, on a correlation between the digital resource and the at least one value.

7. The method of claim 1, wherein a particular resource object is color-coded to represent the degree of correlation between a particular digital resource represented by the particular resource object and a particular criteria represented by a particular attractor object presented together with the particular resource object.

8. The method of claim 1, wherein a particular resource object is color-coded to represent a value associated with a particular digital resource represented by the particular resource object, the value relevant to a particular criteria represented by a particular attractor object presented together with the particular resource object.

9. The method of claim 1, wherein the plurality of digital resources includes a plurality of business objects, each business object in the plurality of business objects including at least one of a set of attributes.

10. The method of claim 1, wherein the plurality of digital resources includes a plurality of internet resources, including at least one webpage.

11. The method of claim 1, wherein the plurality of digital resources are identified in response to a user search query, the plurality of digital resources identified as satisfying the search query.

12. The method of claim 1, wherein each attractor object is adapted to allow a user to change the position of the attractor object in the window of the user interface, wherein resource objects are adapted to automatically re-position in response to and consistent with the changed position of an attractor object.

13. The method of claim 1, wherein the method further comprises sending data defining starting positions of resource objects presented in the window of the user interface, wherein the plurality of resource objects are presented in the window according to the respective starting positions of the resource objects prior to the presentation of an attractor object in the window.

14. The method of claim 13, wherein the starting positions are at least one of a random starting position, an ordered position based on a type of the digital resource represented by the corresponding resource object, and an order position based on an initial score for the digital resource represented by the corresponding resource object.

15. An article comprising a non-transitory, machine-readable storage device storing instructions operable to cause at least one processor to perform operations comprising:

displaying, in a window of a user interface of a computing device, a plurality of graphical resource objects representing a corresponding plurality of digital resources in a set of digital resources stored in at least one computer-readable storage medium;

displaying, in a tray displayed adjacent the window, a plurality of graphical attractor objects representing a corresponding plurality of criteria, wherein each digital resource has a degree of correlation to each criteria;

detecting input to transfer a first graphical attractor object and a second graphical attractor object from the tray into the plurality of graphical resource objects in the window, the first graphical attractor object and the second graphical attractor object representing a first criterion and a second criterion, respectively;

in response to detecting the input to transfer, displaying the first graphical attractor object and the second graphical attractor object among the plurality of graphical resource objects; and automatically re-arranging respective positions of one or more of the plurality of graphical resource objects to be displayed at respective one or more distances from the first graphical attractor object and the second graphical attractor object, wherein each of the one or more distances is based at least in part on a corresponding degree of correlation between the digital resource represented by the graphical resource object and the first and second criteria represented by the first and second graphical attractor objects.

16. A system comprising one or more computers having one or more computer storage devices storing instructions for causing the one or more computers to:

display, in a window of a user interface, a plurality of graphical resource objects representing a corresponding plurality of digital resources in a set of digital resources stored in at least one computer-readable medium;

display, in a tray displayed adjacent the window, a plurality of graphical attractor objects representing a corresponding plurality of criteria, wherein each digital resource has a degree of correlation to each criteria;

receive a first input to transfer a first graphical attractor object and a second graphical attractor object that represents a first criterion and a second criterion, respectively, of the plurality of criteria from the tray into the plurality of graphical resource objects in the window;

in response to receiving the first input, display the first graphical attractor object and the second graphical attractor object among the plurality of graphical resource objects in the window; and automatically re-arrange positions of the plurality of graphical resource objects to be presented at a distance from the first graphical attractor object and the second graphical attractor object, wherein a distance between a graphical resource object and the first graphical attractor object is based at least in part on a corresponding degree of correlation between the digital resource represented by the resource object and the first criterion and the second criterion represented by the first graphical attractor object and the second graphical attractor object, respectively.

17. The system of claim 16 further comprising a plurality of data repositories, each repository including at least one computer-readable storage device, the plurality of data repositories storing a corpus of digital resources.

18. The system of claim 17 further comprising a search engine operable to identify the plurality of digital resources in the corpus of digital resources as satisfying a search query.

* * * * *